US011731238B2

(12) United States Patent
Osterheld et al.

(10) Patent No.: US 11,731,238 B2
(45) Date of Patent: Aug. 22, 2023

(54) MONITORING OF POLISHING PAD TEXTURE IN CHEMICAL MECHANICAL POLISHING

(71) Applicant: Applied Materials, Inc, Santa Clara, CA (US)

(72) Inventors: Thomas H. Osterheld, Mountain View, CA (US); Benjamin Cherian, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 510 days.

(21) Appl. No.: 16/820,299

(22) Filed: Mar. 16, 2020

(65) Prior Publication Data

US 2020/0298368 A1    Sep. 24, 2020

Related U.S. Application Data

(60) Provisional application No. 62/861,907, filed on Jun. 14, 2019, provisional application No. 62/821,935, filed on Mar. 21, 2019.

(51) Int. Cl.
*G06T 7/529* (2017.01)
*G06T 7/40* (2017.01)
(Continued)

(52) U.S. Cl.
CPC ............ *B24B 49/12* (2013.01); *B24B 37/005* (2013.01); *G06T 7/40* (2013.01); *G06T 7/529* (2017.01);
(Continued)

(58) Field of Classification Search
CPC ..... B24B 49/12; B24B 37/005; B24B 49/186; G06T 7/40; G06T 7/529; G06T 17/30;
(Continued)

(56) References Cited

U.S. PATENT DOCUMENTS 5,722,875 A    3/1998  Iwashita et al.
6,594,024 B1 *  7/2003  Singh ................... G01N 21/47
                                                           451/6
(Continued)

FOREIGN PATENT DOCUMENTS

EP        1063056        12/2000
JP      2018-065209       4/2018

OTHER PUBLICATIONS

PCT International Search Report and Written Opinion in International Appln. No. PCT/US2020/022977, dated Jul. 7, 2020 14 pages.
(Continued)

*Primary Examiner* — Amandeep Saini
(74) *Attorney, Agent, or Firm* — Fish & Richardson P.C.

(57) ABSTRACT

An apparatus for chemical mechanical polishing includes a platen having a surface to support a polishing pad, a carrier head to hold a substrate against a polishing surface of the polishing pad, a pad conditioner to press an abrasive body against the polishing surface, an in-situ polishing pad monitoring system including an imager disposed above the platen to capture an image of the polishing pad, and a controller configured to receive the image from the monitoring system and generate a measure of polishing pad surface roughness based on the image. The controller can use machine-learning based image processing to generate the measure of surface roughness.

16 Claims, 3 Drawing Sheets

(51) Int. Cl.
*G06T 17/30* (2006.01)
*G06V 10/10* (2022.01)
*G06V 10/82* (2022.01)
*B24B 49/12* (2006.01)
*B24B 37/005* (2012.01)

(52) U.S. Cl.
CPC .............. *G06T 17/30* (2013.01); *G06V 10/10* (2022.01); *G06V 10/82* (2022.01); *G06T 2207/20081* (2013.01)

(58) Field of Classification Search
CPC . G06T 2207/20081; G06T 2207/10056; G06T 2207/20084; G06V 10/10; G06V 10/82; G06N 3/0481; G06N 3/084; G06N 7/005; G06N 20/10; G06N 20/00; H01L 21/67092; H01L 21/67253
USPC ........................................................ 382/108
See application file for complete search history.

(56) References Cited

U.S. PATENT DOCUMENTS

| | | | |
|---|---|---|---|
| 6,939,207 | B2 | 9/2005 | Jensen et al. |
| 2005/0118839 | A1 | 6/2005 | Chen |
| 2007/0099545 | A1 | 5/2007 | Mavliev et al. |
| 2014/0038501 | A1 | 2/2014 | Birang et al. |
| 2014/0262027 | A1* | 9/2014 | Matsuo ................ G01B 11/303 |
| | | | 356/369 |
| 2015/0303226 | A1* | 10/2015 | Kurihara ........... H01L 27/14643 |
| | | | 257/432 |
| 2018/0304435 | A1 | 10/2018 | Xu et al. |

OTHER PUBLICATIONS

Lawing, "Pad Conditioning and Pad Surface Characterization in Oxide Chemical Mechanical Polishing," MRS Online Proceedings Library (OPL), vol. 732: Symposium I—Chemical-Mechanical Planarization, Feb. 1, 2011, 6 pages.

* cited by examiner

MONITORING OF POLISHING PAD TEXTURE IN CHEMICAL MECHANICAL POLISHING

CROSS-REFERENCE TO RELATED APPLICATIONS

This application claims priority to U.S. Provisional Application Ser. No. 62/861,907, filed on Jun. 14, 2019, and to U.S. Provisional Application Ser. No. 62/821,935, filed on Mar. 21, 2019, the disclosures of which are incorporated by reference.

TECHNICAL FIELD

The present disclosure relates to optical monitoring of a polishing pad used in chemical mechanical polishing.

BACKGROUND

An integrated circuit is typically formed on a substrate by the sequential deposition of conductive, semiconductive, or insulative layers on a silicon wafer. A variety of fabrication processes require planarization of a layer on the substrate. For example, one fabrication step involves depositing a conductive filler layer on a patterned insulative layer to fill the trenches or holes in the insulative layer. The filler layer is then polished until the raised pattern of the insulative layer is exposed. After planarization, the portions of the conductive filler layer remaining between the raised pattern of the insulative layer form vias, plugs and lines that provide conductive paths between thin film circuits on the substrate.

Chemical mechanical polishing (CMP) is one accepted method of planarization. This planarization method typically requires that the substrate be mounted on a carrier head. The exposed surface of the substrate is placed against a rotating polishing pad. The carrier head provides a controllable load on the substrate to push it against the polishing pad. A polishing liquid, such as slurry with abrasive particles, is supplied to the surface of the polishing pad.

After the CMP process is performed for a certain period of time, the surface of the polishing pad can become glazed due to accumulation of slurry by-products and/or material removed from the substrate and/or the polishing pad. Glazing can reduce the polishing rate or increase non-uniformity on the substrate.

Typically, the polishing pad is maintained in with a desired surface roughness (and glazing is avoided) by a process of conditioning with a pad conditioner. The pad conditioner is used to remove the unwanted accumulations on the polishing pad and regenerate the surface of the polishing pad to a desirable asperity. Typical pad conditioners include an abrasive head generally embedded with diamond abrasives which can be scraped against the polishing pad surface to retexture the pad.

SUMMARY

In one aspect, an apparatus for chemical mechanical polishing includes a platen having a surface to support a polishing pad, a carrier head to hold a substrate against a polishing surface of the polishing pad, a pad conditioner to press an abrasive body against the polishing surface, an in-situ polishing pad monitoring system including an imager disposed above the platen to capture an image of the polishing pad, and a controller configured to receive the image from the monitoring system and generate a measure of polishing pad surface roughness based on the image.

Implementations may include one or more of the following features.

The controller may be configured to operate as a machine learning based image processing system, and to input the image to the image processing system. The machine learning based image processing system may include a supervised learning module. The machine learning based image processing system may include a dimensional reduction module to receive the image and output component values, and the controller may be configured to input the component values to the image to the supervised learning module. The controller may be configured to input the image directly to the supervised learning module. The controller may be configured to operate the supervised learning module as an artificial neural network.

The controller may be configured to receive other data including a value for a parameter and may be configured to generate the measure of polishing pad surface roughness based on the image and the value of the parameter. The parameter may be a polishing control parameter, a state parameter, a measurement from a sensor in the polishing system or a measurement of the polishing pad by a sensor outside the polishing system. The parameter may be a platen rotation rate, a slurry dispense rate, a slurry composition, a number of substrates since the polishing pad was changed, or a measurement of the surface roughness of the polishing pad by a stand-alone metrology station before the polishing pad was installed on the platen.

The controller may be configured to at least one of halt a conditioning process or adjust a conditioning parameter based on the measure of polishing pad surface roughness.

The imager may be radially movable over the platen. The imager may be mounted on an arm that can swing laterally over the platen.

In another aspect, a method of polishing includes bringing a substrate into contact with a polishing pad on a platen, generating relative motion between the substrate and the polishing pad, capturing an image of the polishing pad with an optical sensor, and generating a measurement of surface roughness of the polishing pad by inputting the image to a machine learning based image processing system.

Implementations may include one or more of the following features.

Training data including a plurality of pairs of training images and training values may be received. A supervised learning algorithm in the learning based image processing system may be trained using the training data. A conditioning process may be halted or a conditioning parameter may be adjusted based on the measure of polishing pad surface roughness.

Certain implementations man include, but are not limited to, one or more of the following advantages. The roughness of the polishing pad can be determined using a non-contact technique, so contamination and damage to the polishing pad can be avoided. The polishing pad roughness can be determined accurately and quickly, and the conditioning process can be adjusted appropriately. Wafer-to-wafer non-uniformity (WTWNU) can be reduced. The roughness can be determined using non-contact technique, so contamination of the polishing pad can be avoided.

The details of one or more implementations are set forth in the accompanying drawings and the description below.

Other aspects, features and advantages will be apparent from the description and drawings, and from the claims.

BRIEF DESCRIPTION OF DRAWINGS

Like reference symbols in the various drawings indicate like elements.

DETAILED DESCRIPTION

The chemical mechanical polishing process tends to reduce the surface roughness of the polishing pad, e.g., due to the glazing effect noted above. Conditioning can be used to restore the surface roughness. However, the degree to which the pad is glazed, as well as the degree to which conditioning restores surface roughness, can be non-uniform across the polishing pad. As a result, even after conditioning there can be non-uniformity in the polishing pad surface roughness. Moreover, conditioning techniques can wear the pad at different rates across the pad, resulting in non-uniformities in the pad thickness, and can leave periodic scratching or scoring on the polishing pad surface. Contact techniques, e.g., a profilometer, could be used to measure the surface roughness, but this may introduce a risk of contamination and may simply be impractical to fit on the pad given the equipment (conditioner, carrier, etc.) that are already needed. However, the polishing pad can be imaged, and the image can be fed to a trained machine learning model that outputs a surface texture measurement. A controller can then use this measurement to adjust the conditioning process to achieve a target surface texture or improve uniformity of surface texture across the polishing pad.

The term "surface texture" is used herein to encompass surface roughness, e.g., Ra, Rms, RSk, or Rp, and other irregularities in the polishing pad surface, e.g., waviness, that are smaller than the normal grooving or perforations pattern on the polishing pad. For example, assuming 20 mil deep grooves, surface texture might include irregularities up to about 40-50 microns.

Figure 1:
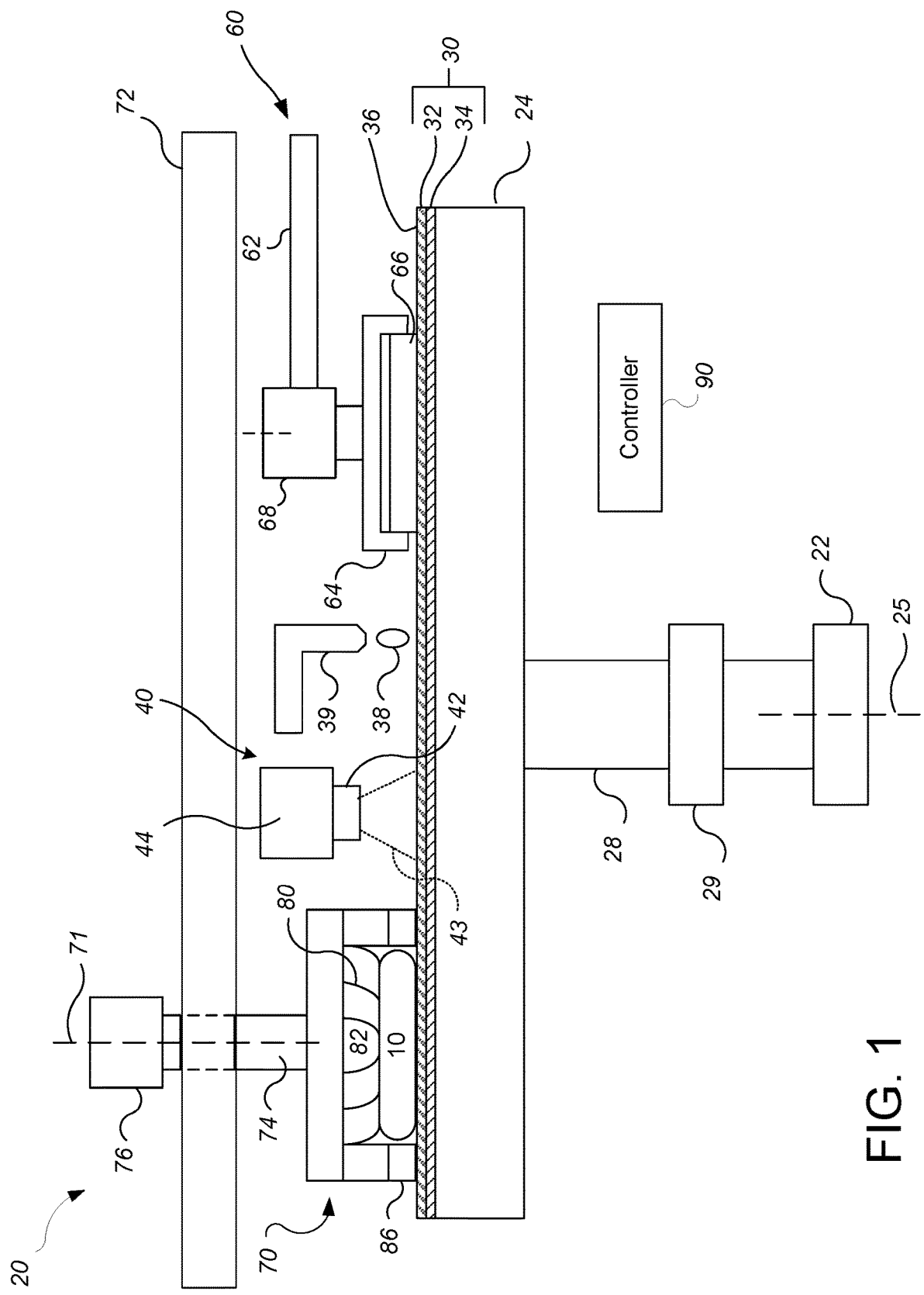
FIG. 1 is a schematic side view, partially cross-sectional, of a chemical mechanical polishing system that includes an optical monitoring system configured to detect a surface roughness of a polishing pad.
Figure 2:
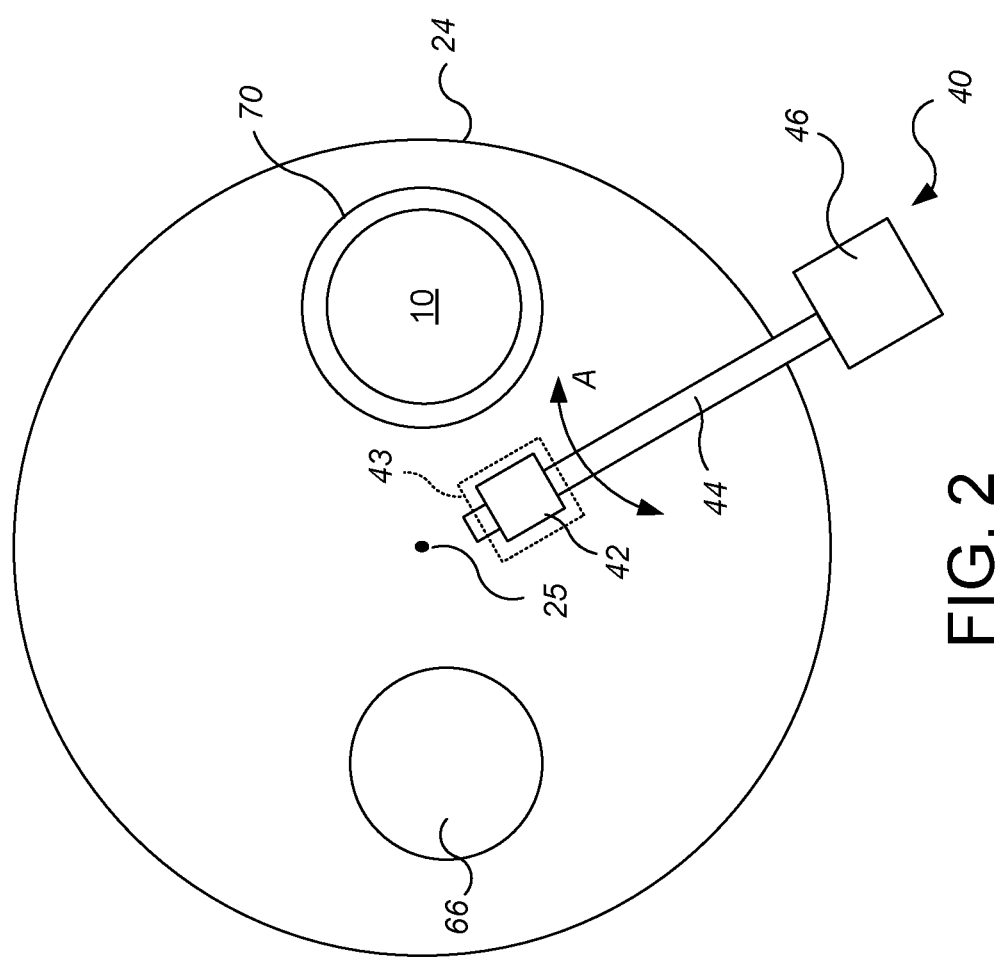
FIG. 2 is a schematic top view of a chemical mechanical polishing system.

FIGS. 1 and 2 illustrate an example of a polishing system 20 of a chemical mechanical polishing apparatus. The polishing system 20 includes a rotatable disk-shaped platen 24 on which a polishing pad 30 is situated. The platen 24 is operable to rotate about an axis 25. For example, a motor 22 can turn a drive shaft 28 to rotate the platen 24. The polishing pad 30 can be a two-layer polishing pad with an outer layer 34 and a softer backing layer 32. The upper surface of the polishing pad 30 provides a polishing surface 36.

The polishing system 20 can include a supply port or a combined supply-rinse arm 39 to dispense a polishing liquid 38, such as slurry, onto the polishing pad 30.

The polishing system 20 can also include a polishing pad conditioner 60 to abrade the polishing pad 30 to maintain the polishing surface 36 in a consistent abrasive state. The polishing pad conditioner 60 includes a base, an arm 62 that can sweep laterally over the polishing pad 30, and a conditioner head 64 connected to the base by the arm 64. The conditioner head 64 brings an abrasive surface, e.g., a lower surface of a disk 66 held by the conditioner head 64, into contact with the polishing pad 30 to condition it. The abrasive surface can be rotatable, and the pressure of the abrasive surface against the polishing pad can be controllable.

In some implementations, the arm 62 is pivotally attached to the base and sweeps back and forth to move the conditioner head 64 in an oscillatory sweeping motion across polishing pad 30. The motion of the conditioner head 64 can be synchronized with the motion of carrier head 70 to prevent collision.

Vertical motion of the conditioner head 64 and control of the pressure of conditioning surface on the polishing pad 30 can be provided by a vertical actuator 68 above or in the conditioner head 64, e.g., a pressurizable chamber positioned to apply downward pressure to the conditioner head 64. Alternatively, the vertical motion and pressure control can be provided by a vertical actuator in the base that lifts the entire arm 62 and conditioner head 64, or by a pivot connection between the arm 62 and the base that permits a controllable angle of inclination of the arm 62 and thus height of the conditioner head 64 above the polishing pad 30.

The carrier head 70 is operable to hold a substrate 10 against the polishing pad 30. The carrier head 70 is suspended from a support structure 72, e.g., a carousel or a track, and is connected by a drive shaft 74 to a carrier head rotation motor 76 so that the carrier head can rotate about an axis 71. Optionally, the carrier head 70 can oscillate laterally, e.g., on sliders on the carousel or track 72; or by rotational oscillation of the carousel itself. In operation, the platen is rotated about its central axis 25, and the carrier head is rotated about its central axis 71 and translated laterally across the top surface of the polishing pad 30. The carrier head 70 can include a flexible membrane 80 having a substrate mounting surface to contact the back side of the substrate 10, and a plurality of pressurizable chambers 82 to apply different pressures to different zones, e.g., different radial zones, on the substrate 10. The carrier head can also include a retaining ring 84 to hold the substrate.

The polishing system 20 includes an in-situ optical pad monitoring system 40 that generates a signal that represents the surface texture, e.g., the surface roughness, of the polishing pad 30. The in-situ optical pad monitoring system 40 includes an imager 42, e.g., a camera, positioned above the polishing pad, e.g., on a support arm 44. For example, the imager 42 can be a line scan camera and the pad monitoring system 40 could be configured to generate a 2-D image from multiple measurements by the line scan camera as the polishing pad 30 sweeps below the camera 40 due to rotation of the platen 24. Alternatively, the imager 42 can be a 2-D camera. The imager 42 can have a field of view 43 of a portion of the surface 36 of the polishing pad 30. The camera can include a CCD array and optical components, e.g., lenses, to focus the imaging plane on the surface 36 of the polishing pad 30.

In some implementations, the imager 42 is positioned in a fixed radial position and images a fixed radial zone of the polishing pad 30. In this situation, the in-situ pad monitoring system 40 can generate measurements for the surface texture, e.g., surface roughness, at fixed radial position on the polishing pad 30.

However, in some implementations, the imager 42 is laterally movable, e.g., along a radius of the polishing pad 30. For example, referring to FIG. 2, a base 46 that holds the support arm 42 could be configured to pivot, thereby swinging the arm 42 (see arrow A) across the polishing pad 30 and carrying the imager 42 in an arc-shaped path. As another example, the support arm 44 can be or include a linear rail, and the imager 42 can be movable by a linear actuator 46, e.g., a stepper motor with linear screw, along the rail. By taking images of the polishing pad 30 for different radial zones, the in-situ pad monitoring system 40 can generate measurements for the surface texture, e.g., surface roughness, at different radial positions on the polishing pad 30.

A controller 90, e.g., a general purpose programmable digital computer, receives the image from the in-situ polishing pad monitoring system 40, and can be configured to generate a measure of the surface texture, e.g., surface roughness, of the polishing pad 30 from the image. In this context, the controller 90 (or the portion of the software that provides the surface texture measurement) can be considered part of the pad monitoring system 40. As noted above, due to the polishing and conditioning processes, the surface roughness of the polishing pad 30 changes over time, e.g., over the course of polishing multiple of substrates.

The controller 90 can also be configured to control the pad conditioner 60 system based on the value of the surface texture, e.g., surface roughness, received from the in-situ pad monitoring system 40. For example, when the measure of surface texture of the polishing pad 30 meets a threshold, the controller 90 can halt the conditioning process. As another example, if the surface texture of the polishing pad meets another threshold, the controller 90 can generate an alert to the operator of the polishing system 20, e.g., that the polishing or conditioning operation is not proceeding as expected.

As another example, if the in-situ pad monitoring system 40 generates measurements for the surface texture, e.g., surface roughness, at different radial positions on the polishing pad 30 (relative to the axis of rotation 25), then the controller 90 can use the measurements to control the pad conditioner 60 to improve the uniformity of the surface texture, e.g., surface roughness. For example, the controller 90 can control the sweep of the conditioner arm 62 to control the dwell time of the conditioner disk 64 in the different radial zones on the polishing pad. For example, if the surface roughness in a radial zone needs to be increased, the dwell time can be increased, whereas if the surface roughness in a radial zone needs to be decreased, the dwell time can be decreased.

Figure 3:
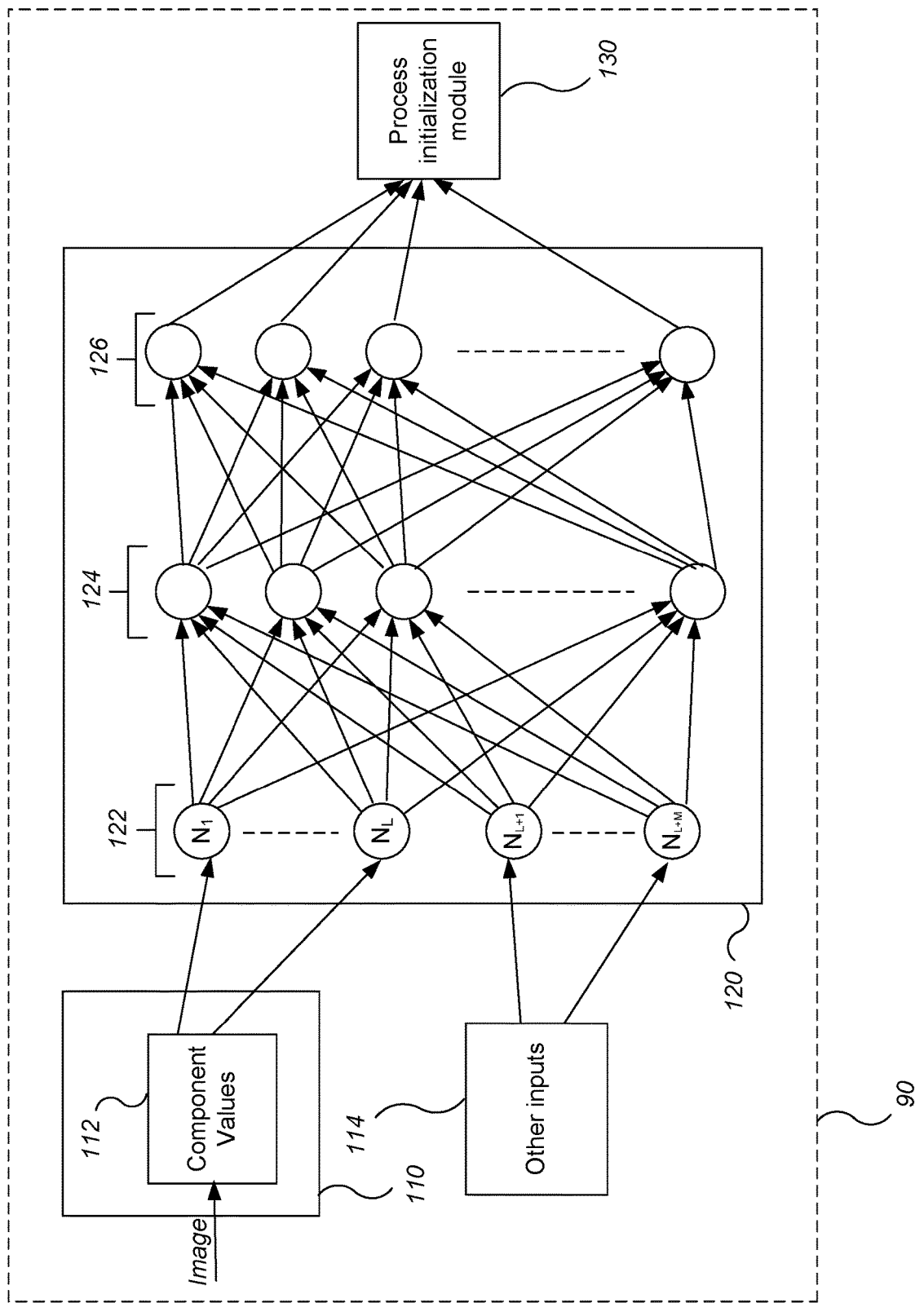
FIG. 3 is a block diagram of a machine learning-based image processing system.

Referring to FIG. 3, the image from the in-situ pad monitoring system 40 is fed into a trained machine-vision image processing system 100. The machine-vision image processing system 100 is configured to output a value representative of the texture, e.g., the surface roughness, of the portion of the polishing surface 36 within the field of view 43 of the imager 42. The machine-vision image processing system 100 can be implemented as part of the controller 90. The machine-vision image processing system 100 can incorporate various machine learning techniques. For example, the machine-vision image processing system 100 can include a neural network, but other approaches are possible, e.g., a naïve Bayes classifier or support vector machine.

FIG. 3 illustrates functional blocks that can be implemented for the machine-learning based image processing system 100. These functional blocks can include an optional dimensional reduction module 110 to carry out dimensional reduction of the image, and a supervised learning module 120 (shown implemented as a neutral network). The supervised learning module 120 implements a supervised learning algorithm to generate a function to output a measurement of the surface texture, e.g., surface roughness, based on the image (or the dimensionally reduced data from the image). These functional blocks can be distributed across multiple computers.

The output of the supervised learning module 120 can be fed to a process control system 130, which can be implemented as part of the controller 90, to adjust the polishing process based on the surface texture measurement. For example, the process control system 130 can detect a conditioning endpoint and halt conditioning and/or adjust the conditioning parameters (e.g., sweep profile, conditioner head pressure, etc.) during or between polishing processes to reduce non-uniformity of the surface texture, e.g., surface roughness, of the polishing surface 36, based on the measurement of the surface texture, e.g., surface roughness.

Assuming the machine learning module 120 is a neutral network, the neural network includes a plurality of input nodes 122 for each principal component, a plurality of hidden nodes 124 (also called "intermediate nodes" below), and an output node 126 that will generate the surface texture, e.g., surface roughness, measurement. In general, a hidden node 124 outputs a value that a non-linear function of a weighted sum of the values from the input nodes 122 to which the hidden node is connected.

For example, the output of a hidden node 124, designated node k, can be expressed as:

$$\tanh(0.5 * a_{k1}(I_1) + a_{k2}(I_2) + \ldots + a_{kM}(I_M) + b_k) \quad \text{Equation 1}$$

where tanh is the hyperbolic tangent, $a_{kx}$ is a weight for the connection between the $k^{th}$ intermediate node and the $x^{th}$ input node (out of M input nodes), and $I_M$ is the value at the $M^{th}$ input node. However, other non-linear functions can be used instead of tanh, such as a rectified linear unit (ReLU) function and its variants.

The optional dimensional reduction module 110 will reduce the image to a more limited number of component values 112, e.g., L component values. The neural network 120 includes an input node 122 for each component into which the image is reduced, e.g., where the dimensional reduction module 110 generates L component values the neural network 120 will include at least input nodes $N_1$, $N_2 \ldots N_L$.

However, supervised learning module 120 may optionally receive one or more inputs 114 other than the image or component values. The other input(s) 114 can include a measurement from another sensor in the polishing system, e.g., a measurement of temperature of the pad by a temperature sensor, or a measurement of slurry flow rate from a flow sensor. The other input(s) can include a value of a polishing control parameter, e.g., a platen rotation rate, slurry flow rate, or slurry composition. The polishing control parameter value can be obtained from a polishing recipe stored by the controller 90. The other input(s) can include a state parameter tracked by the controller, e.g., an identification of the variety of pad (such as manufacturer, brand name, pad composition, grooving pattern, etc.) being used, or a number of substrates polished since the pad was changed). The other input(s) can include a measurement from a sensor that is not part of the polishing system, e.g., a measurement of the surface texture, e.g., surface roughness, of the polishing pad by a stand-alone metrology station before the pad is installed on the platen. This permits the supervised learning module 120 to take into account these other processing or environmental variables in calculation of the surface texture, e.g. surface roughness. Assuming the supervised learning module 120 is a neural network, the neural network can include one or more other input nodes (e.g., node 122a) to receive the other data.

The architecture of the neural network 120 can vary in depth and width. For example, although the neural network 120 is shown with a single column of hidden nodes 124, it could include multiple columns. The number of intermediate nodes 124 can be equal to or greater than the number of input nodes 122. The neural network can be fully connected or a convolutional network.

Before being used for, e.g., processing of device wafers, the supervised learning module 120 needs to be configured.

As part of a configuration procedure, the supervised learning module 120 receives training data, which can include a plurality of training images and a plurality of training values, e.g., surface texture values, e.g., surface roughness values. Each reference image has an training value, i.e., the training data includes pairs of images and training values.

For example, images can be take of various pad samples. In addition, measurements of the surface roughness of the samples can be performed with metrology equipment, e.g., a contact profilometer, interferometer or confocal microscope. Each training image can thus be associated with a training value which is the surface roughness of the sample from which the image was taken.

In some implementations, a data store can store multiple of sets of training data. The different sets of training data could correspond to different types of polishing pads, e.g., different compositions and/or groove patterns. The supervised learning module 120 can receive a selection of a set of training data from the operator of the semiconductor fabrication plant, e.g., through a user interface.

Training of the supervised learning module 120 can be performed using conventional techniques. For example, for a neural network, training can be performed by backpropagation using the training images and the training values. For example, while the neural network is operating in a training mode, the reduced dimensionality values of the training image are fed to the respective input nodes $N_1, N_2 \ldots N_L$ while the training value V is fed to the output node 126. This can be repeated for each pair of an image and a training value. Where the supervised learning module 120 receives inputs other than the image or component values, values for these parameters may also be fed to the machine learning module as training data.

Once the training has been performed, the trained instantiation of the supervised learning module can then be used, e.g., as described above. That is, during processing of a substrate, an image of the polishing pad as well as the other parameter values can be fed to the trained supervised learning module 120, which outputs the value for the surface texture, e.g., surface roughness. The surface texture value, e.g., surface roughness, can then be used to control the conditioning operation, e.g., as discussed above.

The in-situ polishing pad monitoring system can be used in a variety of polishing systems. Either the polishing pad, or the carrier head, or both can move to provide relative motion between the polishing surface and the substrate. The polishing pad can be a circular (or some other shape) pad secured to the platen, a tape extending between supply and take-up rollers, or a continuous belt. The polishing pad can be affixed on a platen, incrementally advanced over a platen between polishing operations, or driven continuously over the platen during polishing. The pad can be secured to the platen during polishing, or there can be a fluid bearing between the platen and polishing pad during polishing. The polishing pad can be a standard (e.g., polyurethane with or without fillers) rough pad, a soft pad, or a fixed-abrasive pad.

In addition, although the foregoing description focuses on monitoring during polishing, the measurements of the polishing pad could be obtained before or after a substrate is being polished, e.g., while a substrate is being transferred to the polishing system.

The controller and its functional operations can be implemented in digital electronic circuitry, or in computer software, firmware, or hardware, or in combinations of them. A controller that is "configured" to perform operations has sufficient software, firmware or hardware to actually perform the operations, and is not merely capable of being programmed or modified to perform the operations.

Embodiments can be implemented as one or more computer program products, i.e., one or more computer programs tangibly embodied in an information carrier, e.g., in a non-transitory machine-readable storage medium or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus for chemical mechanical polishing, comprising:
a platen having a surface to support a polishing pad;
a carrier head to hold a substrate against a polishing surface of the polishing pad;
a pad conditioner to press an abrasive body against the polishing surface;
an in-situ polishing pad monitoring system including an imager disposed above the platen to capture an image of the polishing pad, wherein the imager is configured to focus an imaging plane of the imager on the polishing surface of the polishing pad; and
a controller configured to operate as a machine learning based image processing system trained by a plurality of pairs of training images and surface roughness training values, and to receive the image from the monitoring system and generate a measure of polishing pad surface roughness based on the image by inputting the image to the machine learning based image processing system and receiving the measure of polishing pad surface roughness as output.

2. The apparatus of claim 1, wherein the machine learning based image processing system comprises a supervised learning module.

3. The apparatus of claim 2, wherein the controller is configured to input the image directly to the supervised learning module.

4. The apparatus of claim 2, wherein the controller is configured to operate the supervised learning module as an artificial neural network.

5. The apparatus of claim 1, wherein the controller is configured to receive other data including a value for a parameter and is configured to generate the measure of polishing pad surface texture on the image and the value of the parameter.

6. The apparatus of claim 5, wherein the parameter comprises a polishing control parameter, a state parameter, a measurement from a sensor in the apparatus or a measurement of the polishing pad by a sensor outside the apparatus.

7. The apparatus of claim 6, herein the parameter comprises a platen rotation rate, a slurry dispense rate, a slurry composition, a number of substrates since the polishing pad was changed, or a measurement of the surface roughness of the polishing pad by a stand-alone metrology station before the polishing pad was installed on the platen.

8. The apparatus of claim 1, wherein the controller is configured to at least one of generate an alert, halt a conditioning process, or adjust a conditioning parameter, based on the measure of polishing pad surface roughness.

9. The apparatus of claim 1, wherein the imager is radially movable over the platen.

10. The apparatus of claim 9, wherein the imager is mounted on a pivotable arm to swing laterally over the platen.

11. The apparatus of claim 1, wherein the surface roughness is Ra, Rms, RSk, or Rp.

12. An apparatus for chemical mechanical polishing, comprising:
- a platen having a surface to support a polishing pad;
- a carrier head to hold a substrate against a polishing surface of the polishing pad;
- a pad conditioner to press an abrasive body against the polishing surface;
- an in-situ polishing pad monitoring system including an imager disposed above the platen to capture an image of the polishing pad, and
- a controller configured to operate as a machine learning based image processing system trained by a plurality of pairs of training images and surface roughness training values, and to receive the image from the monitoring system and generate a measure of polishing pad surface roughness based on the image by inputting the image to the machine learning based image processing system and receiving the measure of polishing pad surface roughness as output, wherein the machine learning based image processing system comprises a supervised learning module and a dimensional reduction module to receive the image and output component values, wherein the image has an associated number of dimensions, wherein a number of the component values is less than the associated number of dimensions of the image, and wherein the controller is configured to input the component values for the image to the supervised learning module.

13. A method of polishing, comprising:

bringing a substrate into contact with a polishing surface of a polishing pad on a platen;

generating relative motion between the substrate and the polishing pad;

capturing an image of the polishing pad with an optical sensor, wherein the polishing surface of the polishing pad in the image is in focus;

generating a measurement of surface roughness of the polishing surface of the polishing pad by inputting the image to a machine learning based image processing system trained by a plurality of pairs of training images and surface roughness training values, and receiving the measurement of surface roughness of the polishing pad as output.

14. The method of claim 13, comprising receiving training data including a plurality of pairs of training images and surface roughness training values, and training a supervised learning algorithm in the machine learning based image processing system using the training data.

15. The method of claim 13, comprising generating an alert, halting a conditioning process or adjusting a conditioning parameter based on the measurement of polishing pad surface roughness.

16. The method of claim 13, comprising moving the optical sensor radially across the polishing pad.

* * * * *